(12) United States Patent
Joh (10) Patent No.: US 8,712,691 B2
(45) Date of Patent: Apr. 29, 2014

(54) FUSION OF ROAD GEOMETRY MODEL INFORMATION GATHERED FROM DISPARATE SOURCES

(75) Inventor: Peter Gyumyeong Joh, Bloomfield Hills, MI (US)

(73) Assignee: Ford Global Technologies, Dearborn, MI (US)

( * ) Notice: Subject to any disclaimer, the term of this patent is extended or adjusted under 35 U.S.C. 154(b) by 152 days.

(21) Appl. No.: 13/329,439

(22) Filed: Dec. 19, 2011

(65) Prior Publication Data
US 2013/0158871 A1 Jun. 20, 2013

(51) Int. Cl.
*G01C 21/26* (2006.01)

(52) U.S. Cl.
USPC ............................................. 701/532; 701/2

(58) Field of Classification Search
USPC ............ 701/532, 400, 59, 300, 408; 703/2, 6; 342/357.29; 348/149, E7.085
See application file for complete search history.

(56) References Cited

U.S. PATENT DOCUMENTS

| | | | |
|---|---|---|---|
| 6,185,496 B1 * | 2/2001 | Matsuno | ........................ 701/70 |
| 6,735,515 B2 | 5/2004 | Bechtolsheim | |
| 2009/0088941 A1 * | 4/2009 | Tsuchiya et al. | ................. 701/93 |
| 2010/0004903 A1 * | 1/2010 | Fargas et al. | ...................... 703/1 |
| 2010/0191461 A1 | 7/2010 | Zeng | |
| 2011/0169958 A1 * | 7/2011 | Imai et al. | ..................... 348/149 |

OTHER PUBLICATIONS

Manolis Tsogas Nikos Floudas Panagiotis Lytrivis, Angelos Amditis, Aris Polychronopoulos Combined lane and road attributes extraction by fusing data from digital map, laser scanner and camera Institute of Communication and Computer Systems, Iroon Polytechniou Str. 9, GR-15773, Athens, Greece Jan. 7, 2010, pp. 1-9.
C. Colle, Th. Fraichard, P. Bessiere and E. Mazer Using Bayesian Programming for Multi-Sensor Data Fusion in Automotive Applications IEEE Intelligent Vehicle Symposium Jun. 18-20, 2002, pp. 1-7.

* cited by examiner

*Primary Examiner* — Marthe Marc-Coleman
(74) *Attorney, Agent, or Firm* — Angela M. Brunetti; Frank MacKenzie (57) ABSTRACT

A method and system for implementing the fusion of road geometry model information in different forms from different sources in a manner that is comprehensive, efficient, and effective. Such fused road geometry model information for a particular vehicle (i.e., an ego vehicle) provides for improved performance of active safety functionality. Examples of active safety functionalities include, but are not limited to, curve speed warning, selection of target objects that are potential threats to the ego vehicle by helping the ego vehicle's path prediction, and the like.

22 Claims, 6 Drawing Sheets

FUSION OF ROAD GEOMETRY MODEL INFORMATION GATHERED FROM DISPARATE SOURCES

FIELD OF THE DISCLOSURE

The disclosures made herein relate generally to driver assist features in vehicles and, more particularly, to fusion of road geometry model information gathered from disparate sources.

BACKGROUND

Active safety functionalities in vehicles have grown into an important consideration in the auto industry. To improve the active safety functionalities, it is important to know accurate information about the road over which a vehicle is traveling as well as objects on and adjacent to the road (i.e., target objects). Due to the uncertainties of the sensor measurements and other factors such as for example an object's future behavior, it can be difficult if not impossible to acquire accurate information about the road over which the vehicle is traveling and the target objects. In most instances, it is only practical to reliably acquire the most probable information about the road over which the vehicle is traveling and the target objects. To induce the most probable information, it is well known to use the multiple sensors for acquiring information about the road over which the vehicle is traveling and the target objects.

Implementing fusion of information for a plurality of target objects is well known. However, the fusion of the road geometry model information from different sources such as, for example, vision systems, radar systems, electronic horizon (EH) system and the like has not yet been implemented in a comprehensive, efficient, or effective manner. Therefore, implementing the fusion of the road geometry model information (e.g., road geometry models) from different sources in a manner that is comprehensive, efficient, and effective would be beneficial, desirable and useful.

SUMMARY OF THE DISCLOSURE

Embodiments of the inventive subject matter are directed to implementing the fusion of road geometry model information from different sources in a manner that is comprehensive, efficient, and effective. Such fused road geometry model information (e.g., a synthetic road geometry model) for a particular vehicle (i.e., an ego vehicle) provides for improved performance of active safety functionality. Examples of active safety functionalities include, but are not limited to, curve speed warning, selection of target objects that are potential threats to the ego vehicle by helping the ego vehicle's path prediction, and the like.

In one embodiment of the inventive subject matter, a method comprises receiving road geometry model information generated by each one of a plurality of road geometry model information sources of a vehicle and creating a synthetic road geometry model dependent upon the road geometry model information of a first one of the road geometry model information sources and the road geometry model information of a second one of the road geometry model information sources. The road geometry model information of each one of the road geometry model information sources provides a respective characterization of geometry of an approaching segment of a roadway over which the vehicle is traveling. Creating the synthetic road geometry model is performed in response to determining that the road geometry model information of the first one of the road geometry model information sources and the road geometry model information of the second one of the road geometry model information sources each suitably approximate the geometry of the approaching segment of the roadway.

In another embodiment of the inventive subject matter, a vehicle comprises a plurality of road geometry model information sources and a road geometry model fusing module coupled to each one of the road geometry model information sources. Each one of the road geometry model information sources generates respective road geometry model information defining a respective road geometry model characterizing geometry of an approaching segment of a roadway over which the vehicle is traveling. The road geometry model fusing module compares a first road geometry model generated by a first one of the a first one of the road geometry model information sources to a second road geometry model generated by a second one of the road geometry model information sources and, in response to determining that the first road geometry model and the second road geometry model each suitably approximate the geometry of the approaching segment of the roadway, creates a synthetic road geometry model dependent upon the first road geometry model and the second road geometry model.

In another embodiment of the inventive subject matter, a processor-readable medium has tangibly embodied thereon and accessible therefrom a set of instructions interpretable by at least one data processing device. The processor-readable medium is non-transient. The set of instructions is configured for causing the at least one data processing device to carry out operations for receiving road geometry model information generated by each one of a plurality of road geometry model information sources of a vehicle and for creating a synthetic road geometry model dependent upon the road geometry model information of a first one of the road geometry model information sources and the road geometry model information of a second one of the road geometry model information sources. The road geometry model information of each one of the road geometry model information sources provides a respective characterization of geometry of an approaching segment of a roadway over which the vehicle is traveling. Creating the synthetic road geometry model is performed in response to determining that the road geometry model information of the first one of the road geometry model information sources and the road geometry model information of the second one of the road geometry model information sources each suitably approximate the geometry of the approaching segment of the roadway.

From the disclosures made herein, a skilled person will appreciate that road shape can be represented by various road shape models such as, for example, multi segmented linear model, multi segmented clothoid model, single segment clothoid model, multi segmented constant radius model, and so on. The models can be represented by the model parameter values. Road shape information fusion can be carried out easily by converting each of road shape information from different sensors to a set of points. A set of points represents a road shape line where each point of the road shape line is a specified distance (e.g., 2 meters) from its neighboring points. Because road geometry information sensors provide road shape points having neighboring points far greater apart than 2 meters and/or only provide a few parameter values of a road shape model to represent a road shape, conversion of road shape information into a set of points is preferably performed for each and every portion of incoming road shape information (e.g., each and every road shape model parameter value) from all road geometry model information sensors. For example, in the context of the inventive subject matter, two cameras that are used for road shape information fusion are two different sensors. Fusion of road geometry model information can be performed for any variety/combination of information sources (e.g., electronic horizon (EH) and a vision sensor, a plurality of cameras, a radar and a camera, an EH and a radar, and so on). As such, fusion of road geometry information in accordance with the inventive subject matter can work for any sensor combinations by converting all the incoming road shape information into the corresponding sets of points. Accordingly, fusion of road geometry information can be performed for two sensors, but can also be performed for 3 or more information sources (e.g., sensors). For instance, if it is desired to fuse road geometry information from an EH, a first camera, a second camera, and a radar, road geometry fusion in accordance with the inventive subject matter can be implemented such that the EH and first camera road geometry information can first be fused, then second camera and radar road geometry information can be fused, and then finally fuse the results from the first fusion (EH and first camera) and from the second fusion (second camera and radar). These and other objects, embodiments, advantages and/or distinctions of the inventive subject matter will become readily apparent upon further review of the following specification, associated drawings and appended claims.

DETAILED DESCRIPTION OF THE DRAWING FIGURES

Sensors of current day vehicle have evolved to a point in which they are able to output a considerable amount of information about the road-based environment around the vehicle. In many instances, this information includes road geometry model information that characterizes geometry of an approaching segment of a roadway over which the vehicle is traveling. In this regard, a vehicle can have a plurality of the road geometry model information sources. The road geometry model information for each particular road geometry model information source defines a respective road geometry model. However, some road geometry model information sources of a vehicle provide road geometry model information in a different form from other road geometry model information sources of the vehicle. For instance, radars and vision systems generally provide road geometry model information in terms of road curvature information. In contrast, an Electronic Horizon (EH) system generally provides road geometry model information defined by road shape points that have longitude and latitude spatial information (i.e., a geographic coordinate system) in combination with road curvature information. Thus, a primary objective of embodiments of the inventive subject matter is for road geometry model information from different sources of the same vehicle (e.g., the abovementioned vision system and the EH system) to be fused (e.g., into a synthetic road geometry model) after altering the road geometry model information of one or both of the sources such that the road geometry model information of the sources are in compatible forms. In some embodiments of the inventive subject matter, it will be preferred and/or possible to alter the road geometry model information of one or both of the sources such that the road geometry model information of the sources are compatible (e.g., are in a common form). In view of the disclosures made herein a skilled person will appreciate that road geometry model information sources in the context of the inventive subject matter are not limited to radar systems, vision systems, and EH systems.

Figure 1:
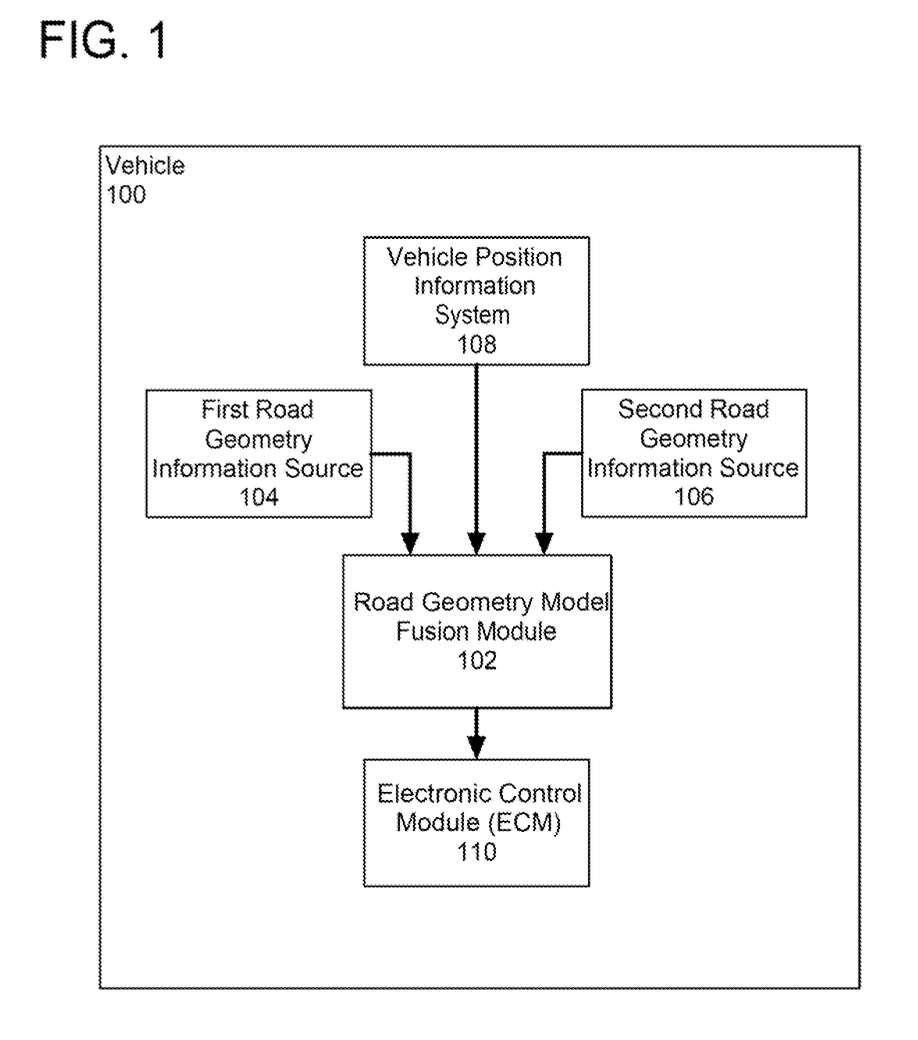
FIG. 1 is a block diagram showing a vehicle configured for providing road geometry model utilization functionality in accordance with an embodiment of the inventive subject matter.

FIG. 1 shows a vehicle 100 configured for providing road geometry model fusion functionality in accordance with an embodiment of the inventive subject matter is shown. The vehicle 100 includes a road geometry model fusion module 102, a first road geometry model information source 104, a second road geometry model information source 106, a vehicle position information system 108, and a vehicle electronic control module 110. The road geometry model fusion module 102 is coupled between the first road geometry model information source 104, the second road geometry model information source 106, the vehicle position information system 108, and the vehicle electronic control module 110. The first and second road geometry model information sources 104, 106 can be any sources (e.g., sensors) that provide road geometry (e.g., shape) information. Examples of road geometry model information sources 104, 106 include, but are not limited to the vision system and the EH system discussed above. A global positioning system (GPS) is an example of the vehicle position information system 108.

The road geometry model fusion module 102 receives information relating to a first road geometry model from the first road geometry model information source 104, receives information relating to a second road geometry model from the second road geometry model information source 106, and receives information defining a position of the vehicle 100 from the vehicle position information system 108. The road geometry model fusion module 102 uses such received information for performing road geometry model fusion functionality (discussed below in detail) of the first and second road geometry models and provides information generated through performing such road geometry model fusion functionality (e.g., a synthetic road geometry model) to the vehicle electronic control module 110.

The road geometry model fusion module 102 can reside in a standalone (i.e., dedicated) module of the vehicle 100 or can reside any existing electronic control module (ECM) of the vehicle 100. For instance, the road geometry model fusion module 102 can be a module that provides for road curvature warning (RCW) functionality, adaptive cruise control (ACC) functionality, forward collision warning (FCW) functionality, and/or other vehicle information functionality. In this regard, instructions and circuitry required for providing road geometry fusion functionality in accordance with the inventive subject matter can be embedded in an existing module of the vehicle 100 that needs road geometry information. An example of the benefit of a fused road geometry model that provides for enhanced road geometry information is that ACC functionality and FCW functionality both have 'target selection' function to adjust vehicle speed of an ego (e.g., the vehicle 100) to a selected leading target vehicle or to give a warning signal to a driver of the ego vehicle. To this end, to select an appropriate target vehicle in a road lane of the ego vehicle, the ego vehicle needs road shape information.

Figure 2:
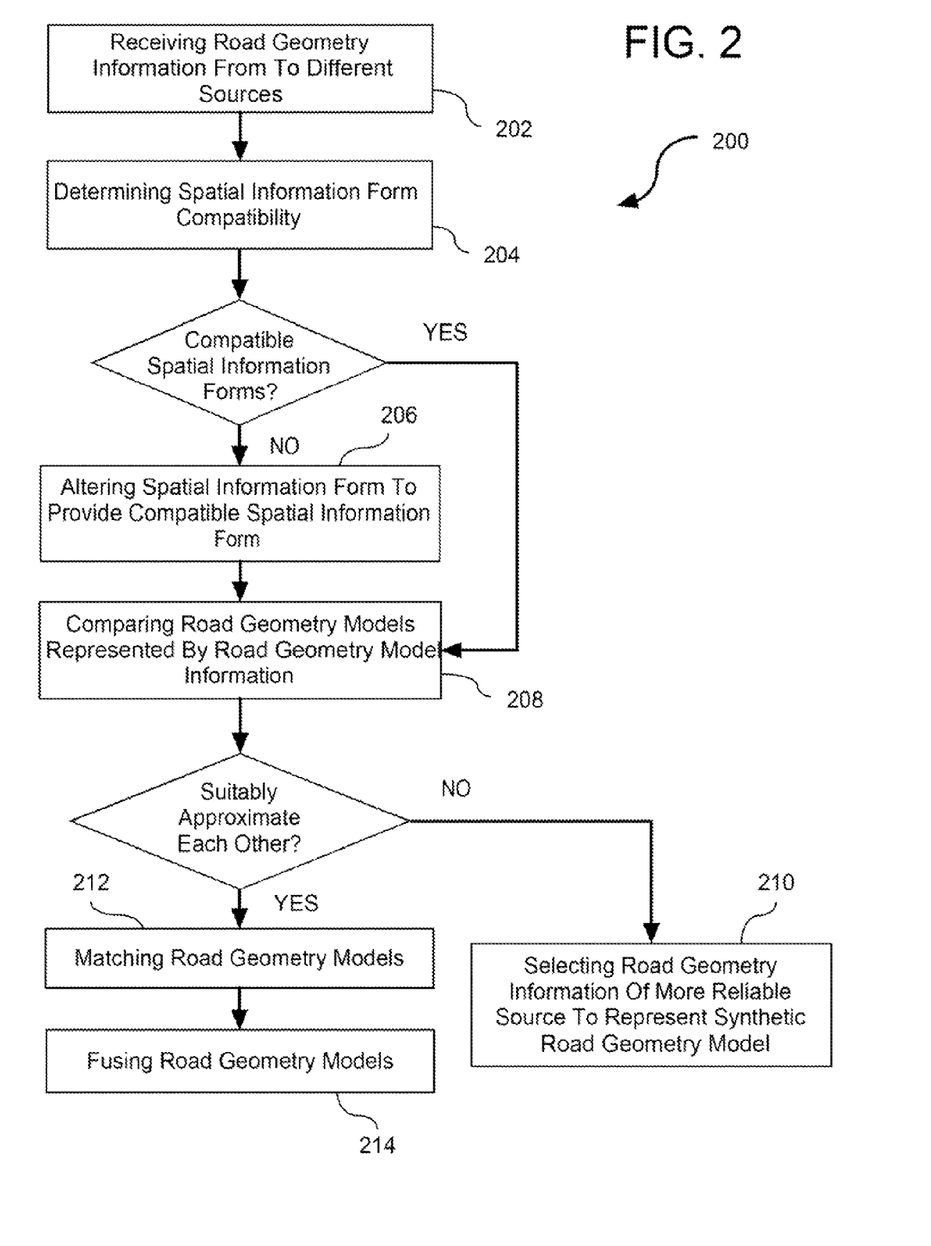
FIG. 2 is a flow chart showing a method for implementing road geometry model fusion functionality in accordance with an embodiment of the inventive subject matter.

Referring now to FIG. 2, a method 200 for implementing road geometry model fusion functionality in accordance with an embodiment of the inventive subject matter is shown. An operation 202 is performed for receiving road geometry model information from a plurality of different road geometry model information sources. The road geometry model information characterizes geometry of an approaching segment of a roadway over which a vehicle (i.e., the ego vehicle) is travelling. In one embodiment of the inventive subject matter, road shape points are used to represent a respective road geometry model derived from the road geometry model information received from each one of the different road geometry model information sources. Each road shape point of a road geometry model is spaced apart from adjacent road shape points by a specified spacing distance (e.g., 20 meters). As discussed above, examples of road geometry model information sources include, but are not limited to, systems that utilize radar for providing road geometry model information (i.e., a radar-based road geometry model information system), systems that utilize vision technology for providing road geometry model information (i.e., a vision-based road geometry model information system), and systems that utilize electronic horizon technology for providing road geometry model information (i.e., an electronic horizon-based road geometry model information system).

After receiving the road geometry model information from the road geometry model information sources, an operation 204 is performed for determining spatial information form compatibility of the road geometry model information received from the various road geometry model information sources. For example, as discussed above, radars and vision systems generally provide road geometry model information in terms of road curvature information whereas and EH system generally provides road geometry model information defined by road shape points that have longitude and latitude spatial information (i.e., a geographic coordinate system) in combination with road curvature information. In this regard, road geometry model information provided by a radar-based road geometry model information system or a vision-based road geometry model information system may not have a spatial information form that is compatible with road geometry model information provided by an electronic horizon-based road geometry model information system for the purposes of implementing fusion of road geometry models in accordance with the inventive subject matter.

In the case where it is determined that a road geometry model of a first one of the road geometry model information sources (i.e., the first road geometry model) is incompatible with the road geometry model of a second one of the road geometry model information sources (i.e., the second road geometry model) as it relates to fusion of such road geometry models, an operation 206 is performed for altering a spatial information form of one or both of the road geometry models to enable such fusion. In one embodiment of the inventive subject matter, the first road geometry model is that generated by an electronic horizon-based road geometry model information system (i.e., the EH system road geometry model) and the second road geometry model is that generated by a vision-based road geometry model information system (i.e., the vision system road geometry model). Because spatial information forms of the first and second road geometry models are incompatible with respect to road geometry model fusion, the EH system road geometry model is altered to allow for such fusion.

Figure 3:
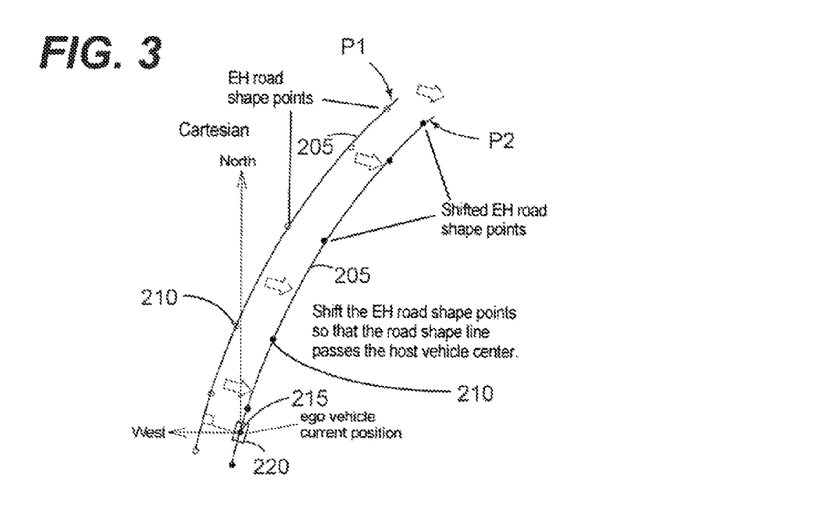
FIG. 3 is a diagrammatic view showing translation of an EH system road shape line defined by a set of base electronic horizon (EH) system road shape points generated by a EH system of an ego vehicle.

The first step in altering the EH system road geometry model involves translating a road shape line 205 defined by the road shape points 210 of the EH system road (i.e., road geometry model information) from an as-provided position P1 to a displaced position P2, as shown in FIG. 3. As a result of the translation, the road shape line 205 passes through a central reference point 215 at a current position of the ego vehicle 220 (e.g., as defined by a global positioning system of the ego vehicle). In this step, the EH system's road shape points along the road on which the ego vehicle is travelling are selected (e.g., up to some defined distance in front of the vehicle (i.e., 200 meters in the depicted example). Longitude and latitude values of the EH system road shape points (i.e., geographic coordinate system information) are converted to x and y distances where the origin of such x and y dimensions is the ego vehicle's current position. The x-distance extends along a North direction and the y-distances extend along a West direction. The EH based road shape points, which are now expressed as x,y distances, is translated such that the road shape line passes through the central reference point 215 of the ego vehicle 220. Examples of the central reference point 215 of the ego vehicle 220 include but are not limited to a center location of a front bumper of the ego vehicle 220, a center of the ego vehicle 220, a reference point defined by a GPS system of the ego vehicle, etc. As shown in FIG. 3, the translation is done for the shortest distance from the central reference point 215 to the road shape line 205 (i.e., a line extending perpendicularly from the road shape line 205 through the central reference point 215). Translation of the road shape line 205 in this manner is required when the EH system road shape points 210 reside on the centerline of the road and are not aligned with the central reference point 215 of the ego vehicle, which often happens when a road for which the ego vehicle is providing road geometry information is wide and has multiple lanes.

Figure 4:
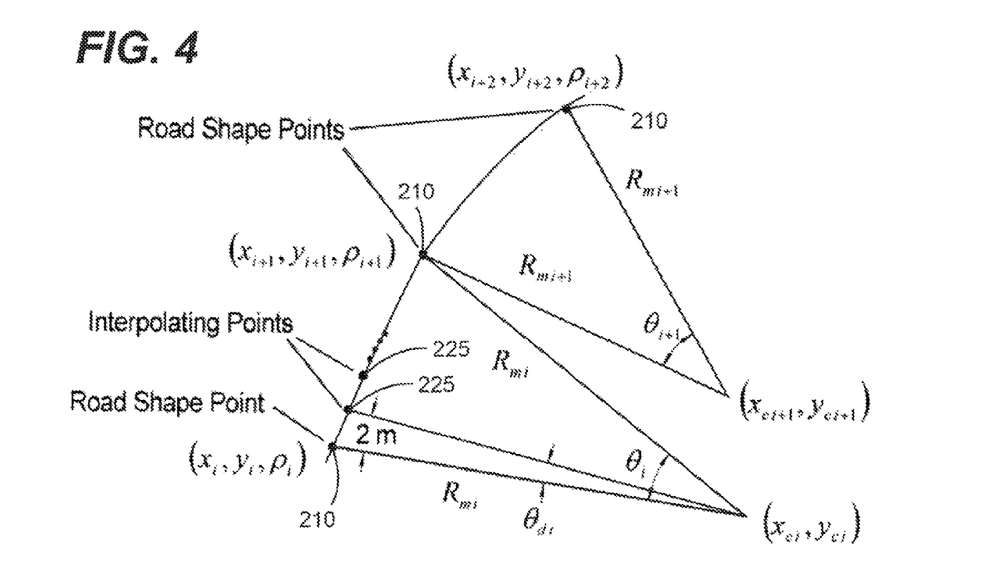
FIG. 4 is a diagrammatic view showing placement of interpolation road shape points between the base EH system road shape points of the EH system road shape line of FIG. 3.

After translating the road shape line 205, altering the EH system road geometry model involves placing interpolating points 225 at a prescribed interval between the road shape points 210 (i.e., 2 meters in the example depicted), as shown in FIG. 4. Because each one of the road shape points 210 of the EH system road geometry model has the corresponding road curvature information (i.e., road geometry information), we can compute its curvature radius and know the location of the curvature center whether it is on the road's left hand side or on the right hand side. Using the curvature information, the following information is computed at each road shape point 210 to determine the interpolating points 225, wherein x=North, y=West, and R=1/curvature (ρ):

(a) Compute the mean radius, $$R_{mi} = \frac{R_i + R_{i+1}}{2}$$

(b) Compute the ceter point $(x_{ei}, y_{ei})$ using $R_{mi}$ and $(x_i, y_i)$, $(x_{i+1}, y_{i+1})$ The location of the center point can be determined by the sign of the road curvature.

(c) Compute $\theta_i$ using the Cosine Law (d) Compute the $\theta_{di}$ that gives 2 meters long arc.

(e) Rotate the $(x_i, y_i)$ by $\theta_{di}$ to $(x_{i1}, y_{i1})$ around the $(x_{ei}, y_{ei})$ $$\begin{pmatrix} x_{i1} \\ y_{i1} \end{pmatrix} = \begin{pmatrix} \cos\theta_{di} & -\sin\theta_{di} \\ \sin\theta_{di} & \cos\theta_{di} \end{pmatrix} \begin{pmatrix} x_i - x_{ci} \\ y_i - y_{ci} \end{pmatrix} + \begin{pmatrix} x_{ci} \\ y_{ci} \end{pmatrix}$$

(f) Repeat (e) from $(x_{i1}, y_{i1})$ to $(x_{i2}, y_{i2})$ around the $(x_{ei}, y_{ei})$ by $\theta_{di}$ as long as the cumulated rotation angle does not exceed $\theta_i$ (g) Compute the last arc segment length in the interval from $(x_i, y_i)$ to $(x_{i+1}, y_{i+1})$. This arc length is less than 2 meters.

(h) Repeal (a) through (g) for the next interval from $(x_{i+1}, y_{i+1})$ to $(x_{i+2}, y_{i+2})$ with a new center point $(x_{ei+1}, y_{ei+1})$. Note that the arc length front $(x_{i+1}, y_{i+1})$ to the first interpolating point is (2 meter—the last arc segment length from (g)).

(i) Repeat (h) until the road shape point $(x_{i+1}, y_{i+1})$ reaches the last road shape point.

Figure 5:
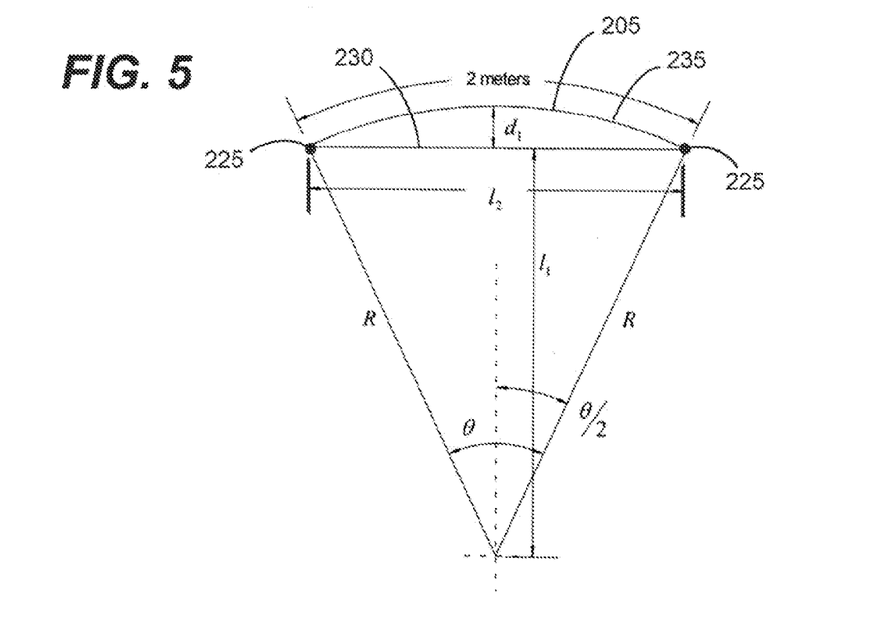
FIG. 5 is a diagrammatic view showing relationship between a piecewise linear curve and straight line segment between two adjacent EH system road shape points of FIG. 3.

Referring to FIG. 5 and Table 1, the reason for selecting the interpolating points 225 at every 2 meters is that the maximum distance ($d_1$) between the straight line 230 and the arc 235 (i.e., respective portion of the road shape line 230) of these two neighboring interpolation points 225 are less than 2 centimeters and the cumulated distance difference sum of $d_2$) along the traveling direction and at 200 meters away from the ego vehicle 220 (FIG. 3) between a piecewise linear curve defined by connecting all the interpolating points by straight line segments and an arc that passes through all the interpolating points 225 is less than 6 centimeters. These distances are calculated for the 25-meter radius road curvature. It should be noted that $d_1$ is not use in the $d_2$ calculations.

$$l_1 = R * \cos\left(\frac{1}{R}\right) \leftarrow R \cdot \theta = 2(\text{meters}) \therefore \frac{\theta}{2} = \frac{1}{R}(\text{rad})$$

$$\therefore d_1 = R\left(1 - \cos\frac{1}{R}\right)$$

$$l_2 = 2 * R\sin\left(\frac{1}{R}\right) \therefore d_2 = 2 - l_2 = 2\left(1 - R\sin\frac{1}{R}\right)$$

Referring to Table 1 below, the length of the circumference of a 25-meter radius circle is less than 200 meters. As such, this short radius curvature can be considered as a worst case for the distance difference calculation. It is disclosed herein that the distance between the interpolating points 225, which is set to be 2 meters in the disclosed embodiment, can be changed to other value depending on the accuracy requirement.

TABLE 1

| R (m): Radius | $d_1$ (m) | $d_2$ (m) | Sum of $d_2$ at 200 meters |
|---|---|---|---|
| 25 | $20 \times 10^{-3}$ | $5.33 \times 10^{-4}$ | 0.053 (m) |
| 50 | $10 \times 10^{-3}$ | $1.33 \times 10^{-4}$ | 0.013 (m) |
| 100 | $5 \times 10^{-3}$ | $3.3 \times 10^{-5}$ | 0.003 (m) |
| 200 | $2.5 \times 10^{-3}$ | $8 \times 10^{-6}$ | <0.001 (m) |
| 500 | $1 \times 10^{-3}$ | $1 \times 10^{-6}$ | <0.001 (m) |

The interpolating points computed above are referred to herein as road shape points in the following discussion of performing road geometry model fusion. Also, the terms road geometry model, the road shape points, the set of road shape points are used interchangeably in the following discussion of performing road geometry model fusion utilizing road geometry model information.

Figure 6:
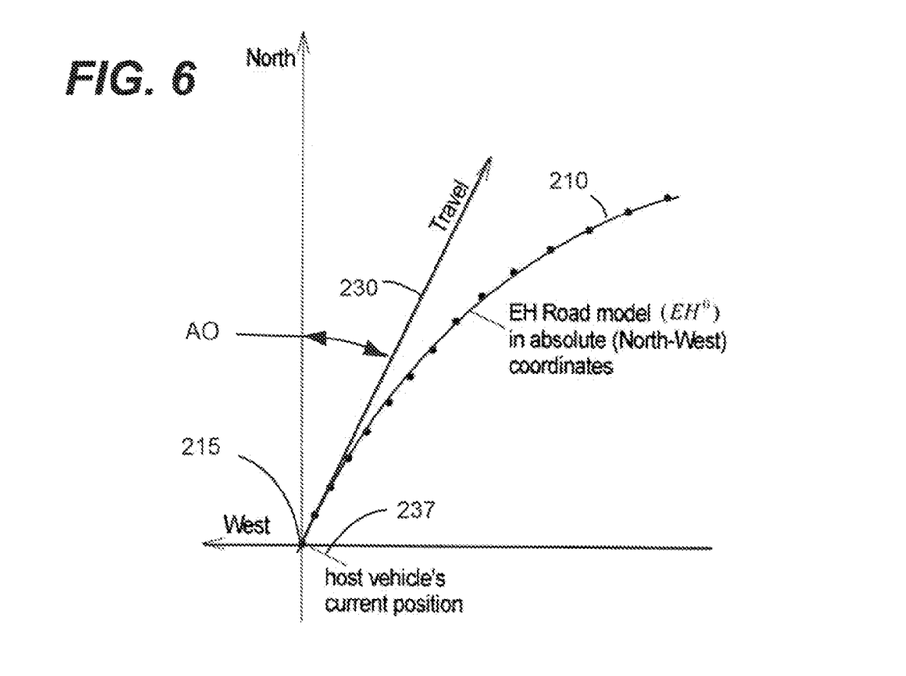
FIG. 6 is a diagrammatic view showing relationship of a vehicle Cartesian coordinate system, a North-West Cartesian coordinate system, and the EH system road shape line of FIG. 3.
Figure 7:
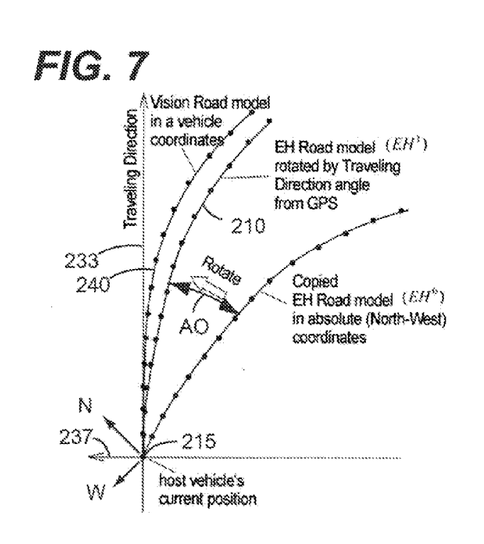
FIG. 7 is a diagrammatic view showing an EH system road shape line rotated into alignment with the vehicle Cartesian coordinate system of FIG. 6.

After placing the interpolating points 225 between the road shape points 210, altering the EH system road geometry model involves align both the EH-based road geometry model and the vision-based road geometry model in the ego vehicle's Cartesian coordinate system. As shown in FIG. 6, the road geometry model from the EH system is represented in the 2 dimensional North-West Cartesian coordinates with an origin at the ego vehicle position. However, as also shown in FIG. 6, a Cartesian coordinate system of the ego vehicle (i.e., the vehicle's Cartesian coordinate system) has an origin point at the ego vehicle's current position (i.e., at its central reference point 215), has a longitudinal axis 233 extending along the ego vehicle's traveling direction, and has a lateral axis 237 extending perpendicular to the ego vehicle's traveling direction. Accordingly, aligning both the EH-based road geometry model and the road vision-based road geometry model in the ego vehicle's Cartesian coordinate system requires rotation of the EH system's road geometry model (i.e., the road shape line for causing it to become aligned with the ego vehicle's Cartesian coordinate system, as shown in FIG. 7. As also shown in FIG. 7, a road shape line 240 of the vision-based road geometry model information system (i.e., the vision system road geometry model) is defined within the ego vehicle's Cartesian coordinate system. Thus, both road geometry models are now represented in the ego vehicle's Cartesian coordinate system whereby they now have compatible spatial information forms in the context of performing road geometry model fusion in accordance with the inventive subject matter. In one embodiment, the amount of rotation is the negative value of the ego vehicle travelling direction angle from North (i.e., angular offset AO in FIGS. 6 and 7).

Referring back to FIG. 2, after the spatial information forms are made compatible at the operation 206 or if the road geometry models were determined to have initially been compatible at the operation 204, the method 200 continues at an operation 208 for comparing the road geometry models to determine if the road geometry models from the different sources match each other. In the context of the inventive subject matter, road geometry models from the different sources matching each other refers to the road geometry models suitably approximating each other. Determining if the road geometry models match each other is necessary because different road geometry information sources are capable of garnishing different types of real-time information that impacts the accuracy of a respective road geometry model. For example, if there is a road construction leading to a detour in the road, an EH system may not readily/timely recognize this situation whereas a road vision system will. As such, the road geometry model from the EH system will be much different from that of the vision system.

Figure 8:
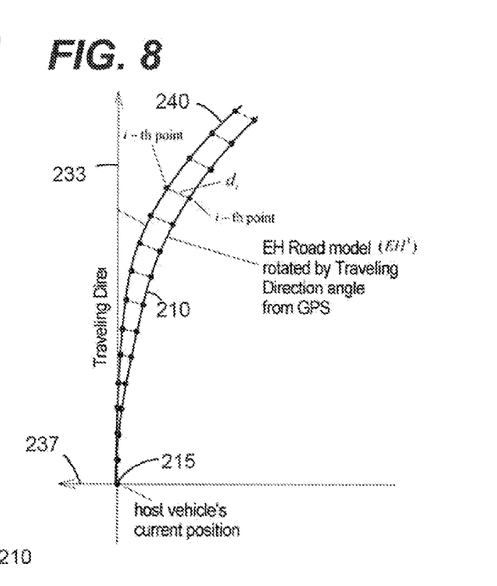
FIG. 8 is a diagrammatic view showing determination of closeness of the EH system road shape line and a vision system road shape line of FIG. 7.

The followings show how to compute the '(Weighted) Mean Squared Error (P)' to check the matching status of the two different road models shown in FIG. 8.

If the $i^{th}$ EH point's position standard deviation is $\sigma_{E,i}$, and the $i^{th}$ Vision system's one is $\sigma_{V,i}$.

$$w_i = \frac{1}{\sigma_i^2} = \left(\frac{1}{\sigma_{E,i}^2 + (\sigma^2)_{V,i}}\right), w_i = \text{weight of } i^{th} \text{ point.}$$

It is assumed that the EH point position variance and the Vision system point position variance are independent.

The weights computed here is an example, and it can be determined in a different way based on the designer's judgement.

The weighted mean squared error (P) is $$P = \sum_{i=1}^{n} w_i \cdot d_i^2,$$

n=total number of the points in a road model
$d_i$=distance between the i-th points from both models If the 'Mean Squared Error' is bigger than or equal to a model closeness threshold value, this means that the two road geometry models are not suitable close to each other (i.e., do not suitably approximate each other) such that the EH system road geometry model is disregarded and an operation 210 is performed for selecting the road geometry model of the more reliable road geometry information source to represent the synthetic (i.e., fused) road geometry model. In the case of this exemplary embodiment, the road geometry model of the vision system (i.e., the vision system road geometry model) is considered to be the road geometry model of the more reliable road geometry information source. Therefore, attempting to implement fusion of the EH system road geometry models and the vision system road geometry model results in the road geometry model from the vision system being utilized as the resulting road geometry model.

If the 'Mean Squared Error' is less than the model closeness threshold, this means that the two road geometry models are suitable close to each other (i.e., do suitably approximate each other) and, thus, an operation 212 is performed for matching the EH system's road shape points (i.e., EH system road geometry model) with vision system's road shape line (i.e., the vision system road geometry model). This matching operation is necessary because sometimes the traveling direction provided by the GPS is not accurate enough, and it is necessary to enhance alignment of the EH based road model to the vision system based road model. For such best matching, an optimization method such as, for example, Newton's method for optimization can be used. This optimization can be performed iteratively for higher accuracy. But, to reduce processing time, it is desirable to limit the number of iterations and thus achieve sub-optimal result. When the best matching or almost best (sub-optimal) matching of the two road models is acquired, it is then possible to fuse the road geometry models. It is disclosed herein that the optimization method is not restricted to Newton's method for optimization and that any other suitable kind of optimization method can be used as long as the optimization is performed well within a short enough time to run in real time.

Figure 9:
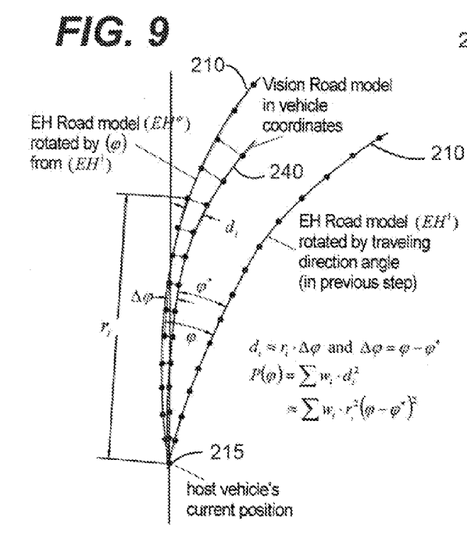
FIG. 9 is a diagrammatic view showing road shape point matching of the EH system road shape line and the vision system road shape line of FIG. 8.

Once the 'Mean Squared Error' is less than the model closeness threshold value, it is known that the two road models are close to each other and that it is desirable to align them better to compensate for error in the 'Traveling Direction Angle' from the GPS. The 'Mean Squared Error (P)' can be represented as a function of the rotation angle because, as shown in FIG. 9, the distances between pairing road shape points of the two road shape lines vary depending on the rotation angle.

Specifically:

$$P(\varphi) = \sum_{i=1}^{n} w_i d(\varphi)_i^2$$

As we see in the diagram, we can roughly say that $P(\phi)$ has a quadratic form.

where $\phi$ is the rotation angle.

Hence the optimal value $\phi'$ can be easily calculated.

$$P(\varphi^*) = \min_{\varphi} P(\varphi)$$

If $P(\phi)$ is of higher order, and if we want more accuracy, this optimal angle $\phi'$ can be acquired by iteration.

A brief summary of the Newton's method for optimization is presented below.

Let's say $\phi_0$ is the initial attempted rotation angle.

This value can be 0.

The Taylor's series expansion of $P(\phi)$ around the $\phi_0$ is $$P(\varphi) = P(\varphi_0) + P'(\varphi_0)\Delta\varphi + \frac{1}{2}P''(\varphi_0)\Delta\varphi^2 + \ldots$$

Since the minimum happens at $P'(\phi)=0$, we take the Taylor's series expansion for $P'(\phi)$.

$$P'(\phi)=P'(\phi_0)+P''(\phi_0)\Delta\phi+\ldots$$

Considering only up to the $2^{nd}$ order derivative because $P(\phi)$ is quadratic, $$P'(\varphi) = P'(\varphi_0) + P''(\varphi_0)\Delta\varphi = 0$$

$$\therefore \Delta\varphi = -\frac{P'(\varphi_0)}{P''(\varphi_0)}$$

This gives the direction and the magnitude of $\phi$ change to the minimum point $\phi'$ at which $P'(\phi')=0$.

Note that because the optimization process is started from the road model that was already rotated by the negative angle of the ego vehicle's traveling direction, it is known that the two road models are already roughly close to each other, and hence this optimization gives the good result, i.e., a global optimization result even when the $P(\phi)$ is of higher order.

Figure 10:
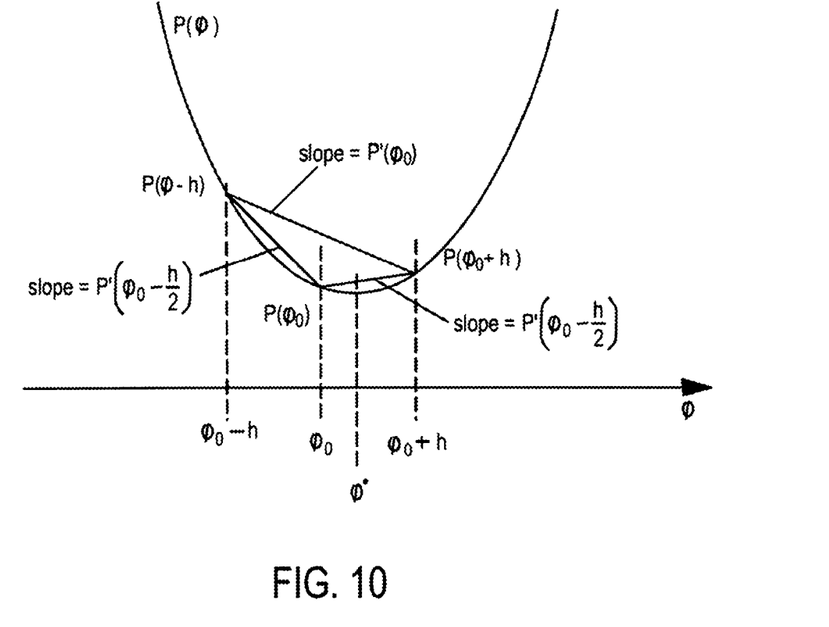
FIG. 10 is a graph showing optimal rotation angle for alignment.

The graph shown in FIG. 10 and equations below show how an optimal rotation angle for alignment is determined, wherein h is a small increment of $\phi$, which is determined empirically.

$$P'(\varphi_0) = \text{slope of } P(\varphi) \text{ at } \varphi_0$$

$$P'(\varphi_0) \approx \frac{P(\varphi_0 + h) - P(\varphi_0 - h)}{(\varphi_0 + h) - (\varphi_0 - h)}$$

$$= \frac{P(\varphi_0 + h) - P(\varphi_0 - h)}{2h}$$

-continued $$P''(\varphi_0) \approx \frac{P'(\varphi_0 + h/2) - P'(\varphi_0 - h/2)}{(\varphi_0 + h/2) - (\varphi_0 - h/2)}$$

$$= \frac{\left\{\frac{P(\varphi_0 + h) - P(\varphi_0)}{h}\right\} - \left\{\frac{P(\varphi_0) - P(\varphi_0 - h)}{h}\right\}}{h}$$

$$= \frac{P(\varphi_0 + h) + P(\varphi_0 - h) - 2P(\varphi_0)}{h^2}$$

$$\therefore \Delta\varphi = -\frac{P'(\varphi_0)}{P''(\varphi_0)}$$

$$= -\frac{\frac{P(\varphi_0 + h) - P(\varphi_0 - h)}{2h}}{\frac{P(\varphi_0 + h) + P(\varphi_0 - h) - 2P(\varphi_0)}{h^2}}$$

$$= \left(\frac{h}{2}\right)\left(\frac{P(\varphi_0 + h) - P(\varphi_0 - h)}{2P(\varphi_0) - (P(\varphi_0 + h) + P(\varphi_0 - h))}\right)$$

Finally $\varphi^* = \varphi_0 + \Delta\varphi$

Figure 11:
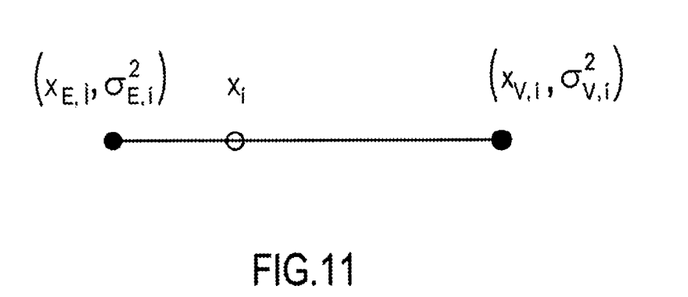
FIG. 11 is a graph showing the x-position of the fused road shape.

Referring back to FIG. 2, after the road geometry models are matched, an operation 214 is performed for fusing the aligned road geometry models using uncertainty information of each road shape point thereby generating a synthetic road geometry model. The graph shown in FIG. 11 and equations below shows how the x-position of the fused road shape point is computed. The y-position of the fused road shape point can be computed in the same or a similar manner.

$$x_i = \frac{\sigma_{V,i}^2 \cdot x_{E,i} + \sigma_{E,i}^2 \cdot x_{V,i}}{\sigma_{V,i}^2 + \sigma_{E,i}^2}$$

$x_{E,i} = i^{th}$ EH's road shape point's $x$ position $\sigma_{E,i}^2 = $ variance of $i^{th}$ EH's road shape point's $x$ position $x_{V,i} = i^{th}$ Vision system's road shape point's $x$ position $\sigma_{V,i}^2 = $ variance of $i^{th}$ Vision system's road shape point's $x$ position $x_i = i^{th}$ fused road shape point's $x$ position In the graph above, the fused road shape point is positioned between the corresponding road shape point of the EH system road geometry model (point to the left of the center point) and the corresponding road shape point of the vision system road geometry model (point to the right of the center point). It should be noted that the position variances of the EH system's road shape points are almost same regardless of the distances from the ego vehicle. On the other hand, the position variances of the road shape points from the vision system are varying depending on the distance from the ego vehicle. The position variance is small when the road shape point is close from the ego vehicle, but it is large when the point is far away. Therefore, the fused road shape points (i.e., located between respective road shape points of the EH system road geometry model and the vision system road geometry model) are close to the vision based road shape points at close distances from the ego vehicle, but as the distance increases, the fused road shape points are inclining to the EH based road shape points.

Referring now to instructions processable by a data processing device, it will be understood from the disclosures made herein that methods, processes and/or operations adapted for carrying out road geometry model fusion functionality as disclosed herein are tangibly embodied by computer readable medium having instructions thereon that are configured for carrying out such functionality. In one specific embodiment, the instructions are tangibly embodied for carrying out the method 200 disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of non-transitory computer readable medium in accordance with the inventive subject matter include a compact disk, a hard drive, RAM or other type of storage apparatus that has imaged thereon a computer program (i.e., instructions) adapted for carrying out road geometry model fusion functionality in accordance with the inventive subject matter.

In the preceding detailed description, reference has been made to the accompanying drawings that form a part hereof, and in which are shown by way of illustration specific embodiments in which the inventive subject matter may be practiced. These embodiments, and certain variants thereof, have been described in sufficient detail to enable those skilled in the art to practice embodiments of the inventive subject matter. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method, carried out by a processor of a vehicle, comprising the steps of:
   receiving road geometry model information generated by each one of a plurality of road geometry model information sources of a vehicle, wherein the road geometry model information of each one of the road geometry model information sources characterizes a geometry of an approaching segment of a roadway over which the vehicle is traveling; and
   creating a synthetic road geometry model dependent upon the road geometry model information of a first one of the road geometry model information sources and the road geometry model information of a second one of the road geometry model information sources in response to determining that the road geometry model information of the first one of the road geometry model information sources and the road geometry model information of the second one of the road geometry model information sources each suitably approximate the geometry of the approaching segment of the roadway;
   the first and second road geometry model information sources providing respective road geometry model information in different spatial information forms; and
   creating the synthetic road geometry model includes altering a spatial information form of at least one of the first one of the road geometry model information sources and the road geometry model information of the second one of the road geometry model information sources such that the road geometry model information of the first and second road geometry model information sources are in compatible spatial information forms.

2. The method of claim 1 wherein:
the road geometry model information of the first one of the road geometry model information sources is configured in terms of a geographic coordinate system; and
the road geometry model information of the second one of road geometry model information sources is configured in terms of road curvature parameters.

3. The method of claim 1 wherein altering the spatial information form includes:
translating a road shape line defined by the road geometry model information of the first one of the road geometry model information sources such that the road shape line passes through a central reference point of the vehicle; and
rotating the road shape line for causing a coordinate system of the road shape line to become aligned with a coordinate system utilized by the road geometry model information of the second one of road geometry model information sources.

4. The method of claim 3 wherein:
the coordinate system of the road shape line is a first two-dimensional orthogonal coordinate system;
the coordinate system utilized by the road geometry model information of the second one of road geometry model information sources is a second two-dimensional orthogonal coordinate system;
the first and second two-dimensional orthogonal coordinate systems lie in a common plane; and
the first two-dimensional orthogonal coordinate system is skewed with respect to the second two-dimensional orthogonal coordinate system prior to rotation of the road shape line.

5. The method of claim 3 wherein:
the road shape line is defined by a plurality of road shape points each expressed using a geographic coordinate system; and
altering the spatial information form includes converting geographic coordinates of each one of the road shape points to Cartesian coordinates having an origin defined by the central reference point of the vehicle.

6. A method, carried out by a processor of a vehicle, comprising the steps of:
receiving road geometry model information generated by each one of a plurality of road geometry model information sources of a vehicle, wherein the road geometry model information of each one of the road geometry model information sources characterizes a geometry of an approaching segment of a roadway over which the vehicle is traveling; and
creating a synthetic road geometry model dependent upon the road geometry model information of a first one of the road geometry model information sources and the road geometry model information of a second one of the road geometry model information sources in response to determining that the road geometry model information of the first one of the road geometry model information sources and the road geometry model information of the second one of the road geometry model information sources each suitably approximate the geometry of the approaching segment of the roadway;
the road geometry model information of the first one of the road geometry model information sources includes a plurality of road shape points defining a road shape line;
each one of the road shape points is expressed using geographic coordinates within a geographic coordinate system; and
creating the synthetic road geometry model includes converting the geographic coordinates of each one of the road shape points to Cartesian coordinates having an origin defined by the central reference point of the vehicle thereby defining the road shape line in Cartesian coordinates, translating the road shape line such that the road shape line passes through a central reference point of the vehicle after converting the geographic coordinates, and rotating the road shape line after translating the road shape line thereby causing a coordinate system of the road shape line to become aligned with a coordinate system utilized by the road geometry model information of the second one of road geometry model information sources.

7. The method of claim 6 wherein creating the synthetic road geometry model includes comparing a quantitative characterization of the road geometry model information of the first one of the road geometry model information sources with a quantitative characterization of the road geometry model information of the second one of the road geometry model information sources after rotating the road shape line for determining if the road geometry model information of the first one of the road geometry model information sources and the road geometry model information of the second one of the road geometry model information sources each suitably approximate the geometry of the approaching segment of the roadway, wherein the road geometry model information of the first one of the road geometry model information sources and the road geometry model information of the second one of the road geometry model information sources each suitably approximate the geometry of the approaching segment of the roadway when a difference between the quantitative characterization of the road geometry model information of the first one of the road geometry model information sources and the quantitative characterization of the road geometry model information of the second one of the road geometry model information sources is less than a characterization difference threshold.

8. A method, carried out by a processor of a vehicle, comprising the steps of:
receiving road geometry model information generated by each one of a plurality of road geometry model information sources of a vehicle, wherein the road geometry model information of each one of the road geometry model information sources characterizes a geometry of an approaching segment of a roadway over which the vehicle is traveling;
creating a synthetic road geometry model dependent upon the road geometry model information of a first one of the road geometry model information sources and the road geometry model information of a second one of the road geometry model information sources in response to determining that the road geometry model information of the first one of the road geometry model information sources and the road geometry model information of the second one of the road geometry model information sources each suitably approximate the geometry of the approaching segment of the roadway; and
creating the synthetic road geometry model includes comparing a quantitative characterization of the road geometry model information of the first one of the road geometry model information sources with a quantitative characterization of the road geometry model information of the second one of the road geometry model information sources for determining if the road geometry model information of the first one of the road geometry model information sources and the road geometry model information of the second one of the road geometry model information sources each suitably approximate the geometry of the approaching segment of the roadway, wherein the road geometry model information of the first one of the road geometry model information sources and the road geometry model information of the second one of the road geometry model information sources each suitably approximate the geometry of the approaching segment of the roadway when a difference between the quantitative characterization of the road geometry model information of the first one of the road geometry model information sources and the quantitative characterization of the road geometry model information of the second one of the road geometry model information sources is less than a characterization difference threshold.

9. The method of claim 8 wherein:
the first and second road geometry model information sources provide respective road geometry model, information in different spatial information forms; and
creating the synthetic road geometry model includes altering a spatial information form of at least one of the road geometry model information of the first one of the road geometry model information sources and the road geometry model information of the second one of road geometry model information sources such that the road geometry model information of the first and second road geometry model information sources are in compatible spatial information forms.

10. A vehicle system having at least one data processing device for carrying out instructions to implement road geometry model fusion, the system comprising:
a plurality of road geometry model information sources each generating respective road geometry model information defining a respective road geometry model characterizing a geometry of an approaching segment of a roadway over which the vehicle is traveling; and
a road geometry model fusing module coupled to each one of the road geometry model information sources, wherein the road geometry model fusing module compares a first road geometry model generated by a first one of the a first one of the road geometry model information sources to a second road geometry model generated by a second one of the road geometry model information sources and, in response to determining that the first road geometry model and the second road geometry model each suitably approximate the geometry of the approaching segment of the roadway, creates a synthetic road geometry model dependent upon the first road geometry model and the second road geometry model;
the first and second road geometry model information sources provide the respective road geometry mode information in different spatial forms; and
the road geometry model fusing module alters a spatial information form of at least one of the road geometry model information of the first one of the road geometry model information sources and the road geometry model information of the second one of road geometry model information sources such that the road geometry model information of the first and second road geometry model information sources are in compatible spatial information forms.

11. The system of claim 10 further comprises:
the road geometry model fusing module translates a road shape line defined by the road geometry model information of the first one of the road geometry model information sources such that the road shape line passes through a central reference point of the vehicle; and
the road geometry model fusing module rotates the road shape line for causing a coordinate system of the road shape line to become aligned with a coordinate system utilized by the road geometry model information of the second one of road geometry model information sources.

12. The system of claim 11 wherein:
the coordinate system of the road shape line is a first two-dimensional orthogonal coordinate system;
the coordinate system utilized by the road geometry model information of the second one of road geometry model information sources is a second two-dimensional orthogonal coordinate system;
the first and second two-dimensional orthogonal coordinate systems lie in a common plane; and
the first two-dimensional orthogonal coordinate system is skewed with respect to the second two-dimensional orthogonal coordinate system prior to rotation of the road shape line.

13. The system of claim 12 wherein:
the road shape line is defined by a plurality of road shape points each expressed using a geographic coordinate system; and
the road geometry model fusion module alters the spatial information form includes convening, geographic coordinates of each one of the road shape points to Cartesian coordinates having an origin defined by the central reference point of the vehicle.

14. A vehicle system having at least one data processing device for carrying out instructions to implement road geometry model fusion the system comprising:
a plurality of road geometry model information sources each generating respective road geometry model information defining a respective road geometry model characterizing a geometry of an approaching segment of a roadway over which the vehicle is traveling; and
a road geometry model fusing module coupled to each one of the road geometry model information sources, wherein the road geometry model fusing module compares a first road geometry model generated by a first one of the a first one of the road geometry model information sources to a second road geometry model generated by a second one of the road geometry model information sources and, in response to determining that the first road geometry model and the second road geometry model each suitably approximate the geometry of the approaching segment of the roadway creates a synthetic road geometry model dependent upon the first road geometry model and the second road geometry model;
the road geometry model fusing module compares a quantitative characterization of the first road geometry model with a quantitative characterization of the second road geometry model for determining if the first road geometry model and the second road geometry model each suitably approximate the geometry of the approaching segment of the roadway, wherein the first road geometry model and the second road geometry model each suitably approximate the geometry of the approaching segment of the roadway when a difference between the quantitative characterization of the first road geometry model and the quantitative characterization of the second road geometry model is less than a characterization difference threshold.

15. A processor-readable medium having tangibly embodied thereon and accessible therefrom a set of instructions interpretable by at least one data processing device, the processor-readable medium being non-transient, the set of instructions configured for causing the at least one data processing device to carry out operations for:
- receiving road geometry model information generated by each one of a plurality of road geometry model information sources of a vehicle, wherein the road geometry model information of each one of the road geometry model information sources characterizes a geometry of an approaching segment of a roadway over which the vehicle is traveling; and
- creating a synthetic road geometry model dependent upon the road geometry model information of a first one of the road geometry model information sources and the road geometry model information of a second one of the road geometry model information sources in response to determining that the road geometry model information of the first one of the road geometry model information sources and the road geometry model information of the second one of the road geometry model information sources each suitably approximate the geometry of the approaching segment of the roadway, the first and second road geometry model information sources provide respective road geometry model information in different spatial information forms; and
- altering a spatial information form of at least one of the road geometry model information of the first one of the road geometry model information sources and the road geometry model information of the second one of road geometry model information sources such that the road geometry model information of the first and second road geometry model information sources are in compatible spatial information forms.

16. The processor-readable medium of claim 15 wherein altering the spatial information form includes:
- translating a road shape line defined by the road geometry model information of the first one of the road geometry model information sources such that the road shape line passes through a central reference point of the vehicle; and
- rotating the road shape line for causing a coordinate system of the road shape line to become aligned with a coordinate system utilized by the road geometry model information of the second one of road geometry model information sources.

17. The processor-readable medium of claim 16 wherein:
- the coordinate system of the road shape line is a first two-dimensional orthogonal coordinate system;
- the coordinate system utilized by the road geometry model information of the second one of road geometry model information sources is a second two-dimensional orthogonal coordinate system;
- the first and second two-dimensional orthogonal coordinate systems lie in a common plane; and
- the first two-dimensional orthogonal coordinate system is skewed with respect to the second two-dimensional orthogonal coordinate system prior to rotation of the road shape line.

18. The processor-readable medium of claim 16 wherein:
- the road shape line is defined by a plurality of road shape points each expressed using a geographic coordinate system, and
- altering the spatial information form includes convening geographic coordinates of each one of the road shape points to Cartesian coordinates having an origin defined, by the central reference point of the vehicle.

19. A processor-readable medium having tangibly embodied thereon and accessible therefrom a set of instructions interpretable by at least one data processing device, the processor-readable medium being non-transient, the set of instructions configured for causing the at least one data processing device to carry out operations for:
- receiving road geometry model information generated by each one of a plurality of road geometry model information sources of a vehicle, wherein the road geometry model information of each one of the road geometry model information sources characterizes a geometry of an approaching segment of a roadway over which the vehicle is traveling;
- creating a synthetic road geometry model dependent upon the road geometry model information of a first one of the road geometry model information sources and the road geometry model information of a second one of the road geometry model information sources in response to determining that the road geometry model information of the first one of the road geometry model information sources and the road geometry model information of the second one of the road geometry model information sources each suitably approximate the geometry of the approaching segment of the roadway;
- the road geometry model information of the first one of the road geometry model information sources includes a plurality of road shape points defining a road shape line;
- each one of the road shape points is expressed using geographic coordinates within a geographic coordinate system; and
- creating the synthetic road geometry model includes converting the geographic coordinates of each one of the road shape points to Cartesian coordinates having an origin defined by the central reference point of the vehicle thereby defining the road shape line in Cartesian coordinates, translating the road shape line such that the road shape line passes through a central reference point of the vehicle after converting the geographic coordinates, and rotating the road shape line after translating the road shape line thereby causing a coordinate system of the road shape line to become aligned with a coordinate system utilized by the road geometry model information of the second one of road geometry model information sources.

20. The processor-readable medium of claim 19 wherein creating the synthetic road geometry model includes comparing a quantitative characterization of the road geometry model information of the first one of the road geometry model information sources with a quantitative characterization of the road geometry model information of the second one of the road geometry model information sources after rotating the road shape line for determining if the road geometry model information of the first one of the road geometry model information sources and the road geometry model information of the second one of the road geometry model information sources each suitably approximate the geometry of the approaching segment of the roadway, wherein the road geometry model information of the first one of the road geometry model information sources and the road geometry model information of the second one of the road geometry model information sources each suitably approximate the geometry of the approaching segment of the roadway when a difference between the quantitative characterization of the road geometry model information of the first one of the road geometry model information sources and the quantitative characterization of the road geometry model information of the second one of the road geometry model information sources is less than a characterization difference threshold.

21. A processor-readable medium having tangibly embodied thereon and accessible therefrom a set of instructions interpretable by at least one data processing device, the processor-readable medium being non-transient, the set of instructions configured for causing the at least one data processing device to carry out operations for:
receiving road geometry model information generated by each one of a plurality of road geometry model information sources of a vehicle, wherein the road geometry model information of each one of the road geometry model information sources characterizes a geometry of an approaching segment of a roadway over which the vehicle is traveling;
creating a synthetic road geometry model dependent upon the road geometry model information of a first one of the road geometry model information sources and the road geometry model information of a second one of the road geometry model information sources in response to determining that the road geometry model information of the first one of the road geometry model information sources and the road geometry model information of the second one of the road geometry model information sources each suitably approximate the geometry of the approaching segment of the roadway;
creating the synthetic road geometry model includes comparing a quantitative characterization of the road geometry model information of the first one of the road geometry model information sources with a quantitative characterization of the road geometry model information of the second one of the road geometry model information sources for determining if the road geometry model information of the first one of the road geometry model information sources and the road geometry model information of the second one of the road geometry model information sources each suitably approximate the geometry of the approaching segment of the roadway, wherein the road geometry model information of the first one of the road geometry model information sources and the road geometry model information of the second one of the road geometry model information sources each suitably approximate the geometry of the approaching segment of the roadway when a difference between the quantitative characterization of the road geometry model information of the first one of the road geometry model information sources and the quantitative characterization of the road geometry model information of the second one of the road geometry model information sources is less than a characterization difference threshold.

22. The processor-readable medium of claim 21 wherein:
the first and second road geometry model information sources provide respective road geometry model information in different spatial information forms; and
creating the synthetic road geometry model includes altering a spatial information form of at least one of the road geometry model information of the first one of the road geometry model information sources and the road geometry model information of the second one of road geometry model information sources such that the road geometry model information of the first and second road geometry model information sources are in compatible spatial information forms.

* * * * *